US011401826B2

(12) United States Patent
Choi

(10) Patent No.: US 11,401,826 B2
(45) Date of Patent: Aug. 2, 2022

(54) STATOR STRUCTURE AND GAS TURBINE HAVING THE SAME

(71) Applicant: DOOSAN HEAVY INDUSTRIES & CONSTRUCTION CO., LTD., Changwon-si (KR)

(72) Inventor: Jae Woo Choi, Changwon (KR)

(*) Notice: Subject to any disclaimer, the term of this patent is extended or adjusted under 35 U.S.C. 154(b) by 1 day.

(21) Appl. No.: 17/153,427

(22) Filed: Jan. 20, 2021

(65) Prior Publication Data
US 2021/0262356 A1    Aug. 26, 2021

(30) Foreign Application Priority Data

Feb. 24, 2020    (KR) .................. 10-2020-0022468

(51) Int. Cl.
*F01D 9/04*    (2006.01)
*F02C 3/04*    (2006.01)

(52) U.S. Cl.
CPC ............... *F01D 9/041* (2013.01); *F02C 3/04* (2013.01); *F05D 2220/32* (2013.01); *F05D 2240/121* (2013.01); *F05D 2240/24* (2013.01)

(58) Field of Classification Search
CPC ........ F01D 11/04; F01D 17/162; F01D 5/145; F01D 9/041; F02C 3/04; F04D 29/563; F04D 29/682; F04D 29/684; F05D 2220/32; F05D 2240/121; F05D 2240/24; F05D 2250/14; F05D 2250/75
See application file for complete search history.

(56) References Cited

U.S. PATENT DOCUMENTS

| 3,348,414 A | * | 10/1967 | Everett | .................. | G01K 13/02 |
| | | | | | 374/115 |
| 4,395,195 A | * | 7/1983 | De Cosmo | ............ | F01D 17/162 |
| | | | | | 415/137 |
| 4,605,315 A | * | 8/1986 | Kokoszka | ............. | F01D 21/003 |
| | | | | | 374/138 |

(Continued)

FOREIGN PATENT DOCUMENTS

| JP | 2004084572 | 3/2004 |
| KR | 20190094955 | 8/2019 |

OTHER PUBLICATIONS

Office Action dated Feb. 14, 2021 by the Korea Patent Office.

*Primary Examiner* — Jesse S Bogue
(74) *Attorney, Agent, or Firm* — Harvest IP Law, LLP

(57) ABSTRACT

A stator structure and a gas turbine having the same are provided. The stator structure includes a plurality of rows of stators arranged on an inner peripheral surface of a casing, the stators being arranged alternately with a plurality of rows of blades arranged on an outer peripheral surface of a rotor, wherein each of the stators includes a vane including a first end and a second end, the first end of the vane being coupled to the inner peripheral surface of the casing by a first rotating member and a diaphragm coupled to the second end of the vane by a second rotating member. A first gap is formed between the first end of the vane and the inner peripheral surface of the casing, and a second gap is formed between the second end of the vane and the diaphragm. The vane may be provided with a slot part connected to the first and second ends of the vane to bypass a part of working fluid to the first and second gaps.

18 Claims, 10 Drawing Sheets

(56) References Cited

U.S. PATENT DOCUMENTS

| | | | |
|---|---|---|---|
| 5,752,802 A * | 5/1998 | Jones | F01D 5/20 |
| | | | 415/174.4 |
| 2008/0025839 A1* | 1/2008 | Schilling | F01D 17/162 |
| | | | 416/61 |
| 2014/0178198 A1* | 6/2014 | Bluck | F01D 5/187 |
| | | | 416/1 |
| 2014/0286750 A1 | 9/2014 | Laubender et al. | |
| 2016/0251980 A1* | 9/2016 | Slavens | F01D 5/12 |
| | | | 60/806 |
| 2018/0230836 A1* | 8/2018 | Tibbott | F01D 5/189 |
| 2019/0120070 A1* | 4/2019 | Tsuruta | F01D 11/001 |

* cited by examiner

[FIG. 1]
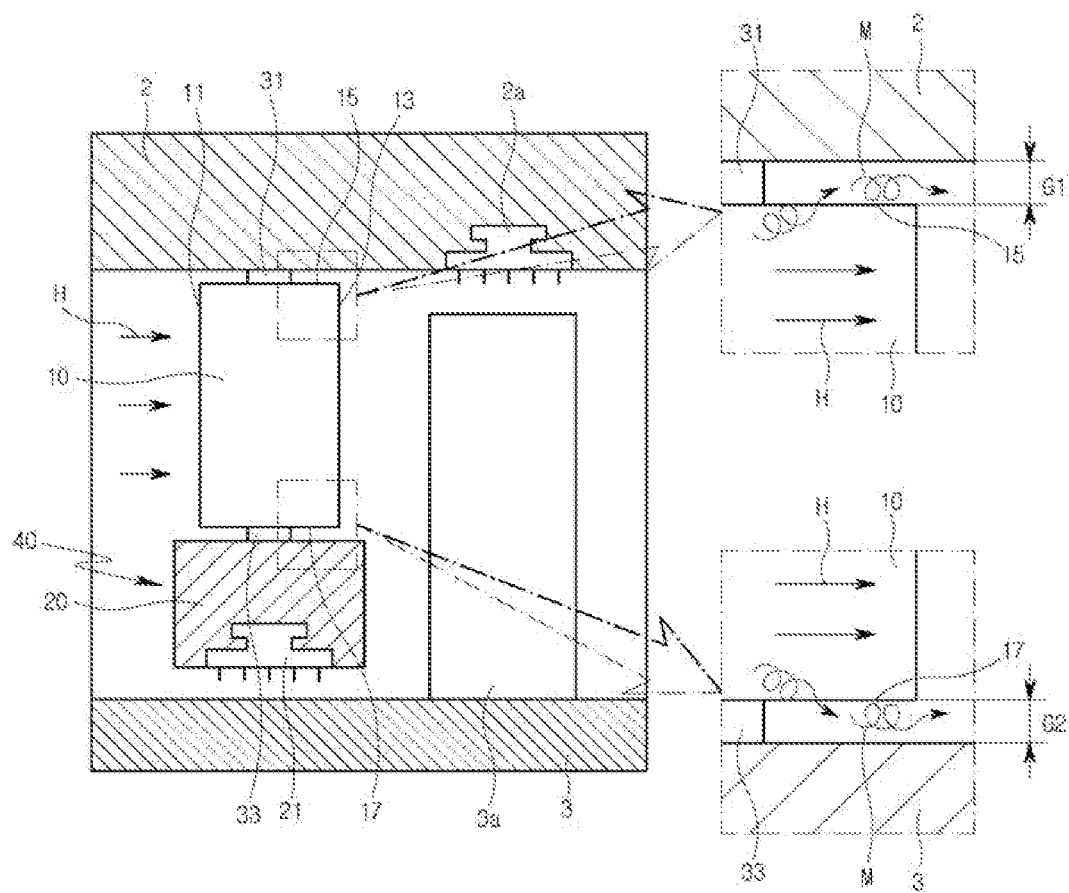
Related Art

[FIG. 2]
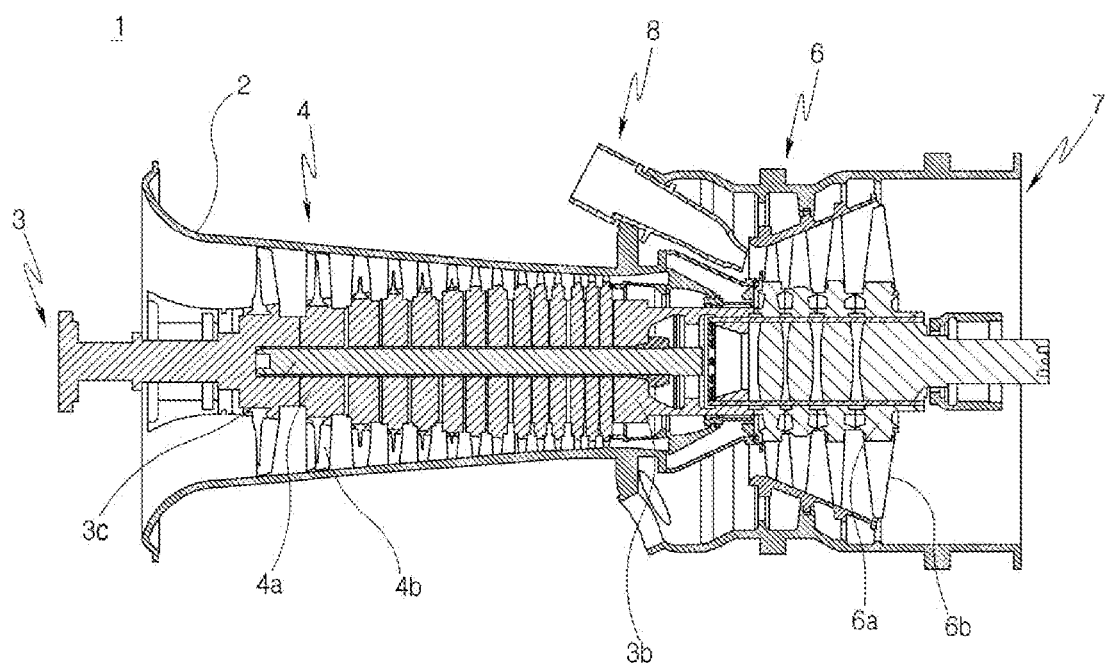

[FIG. 3]
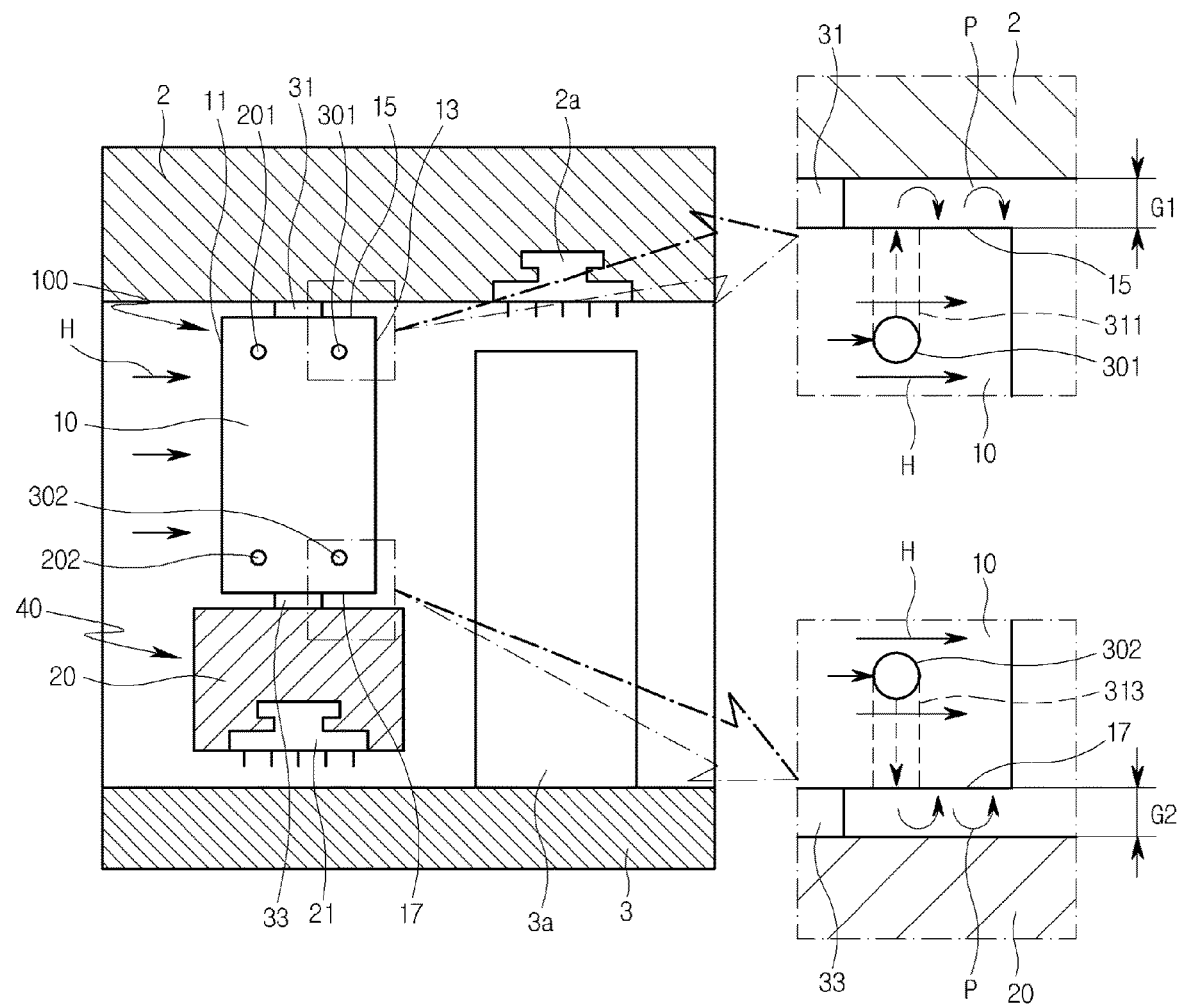

[FIG. 4A]
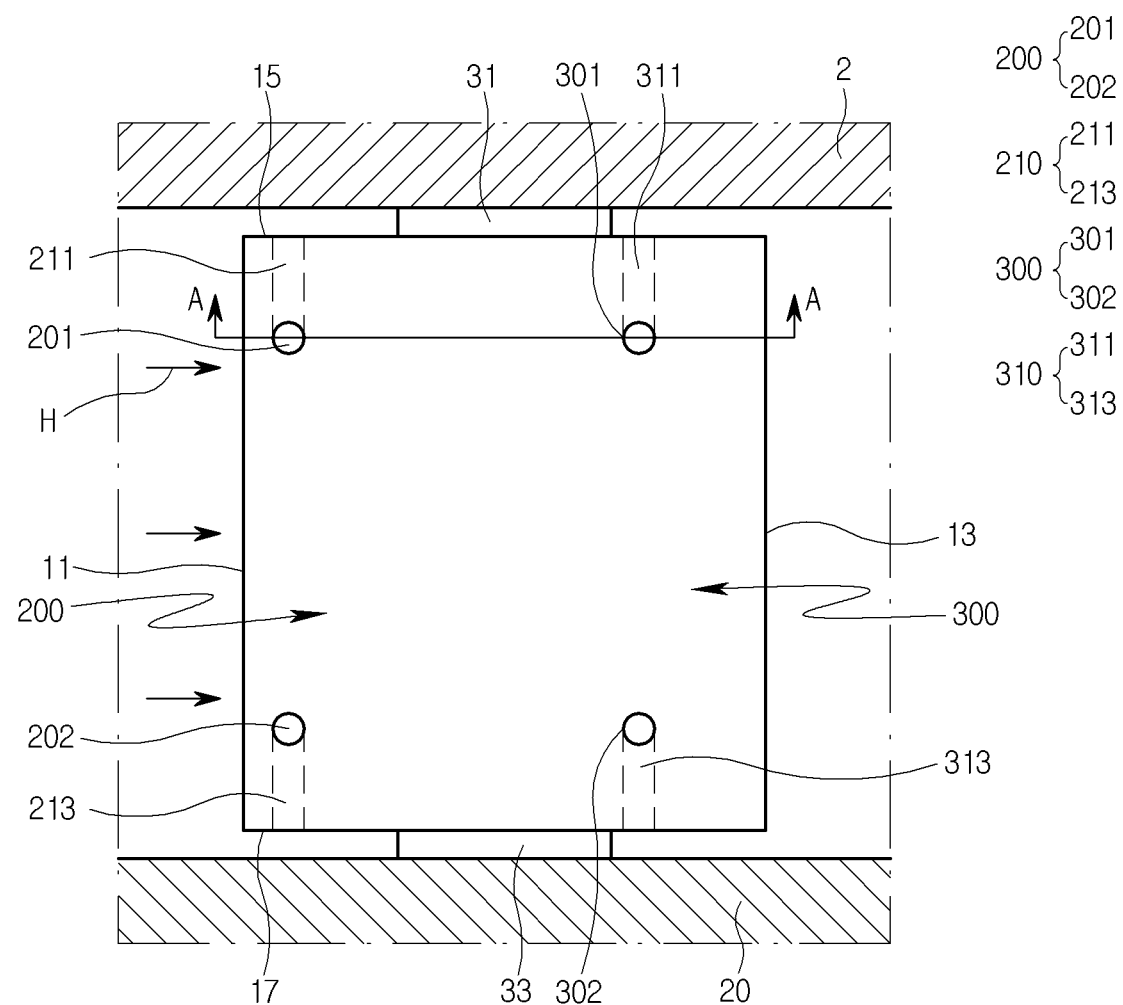

[FIG. 4B]
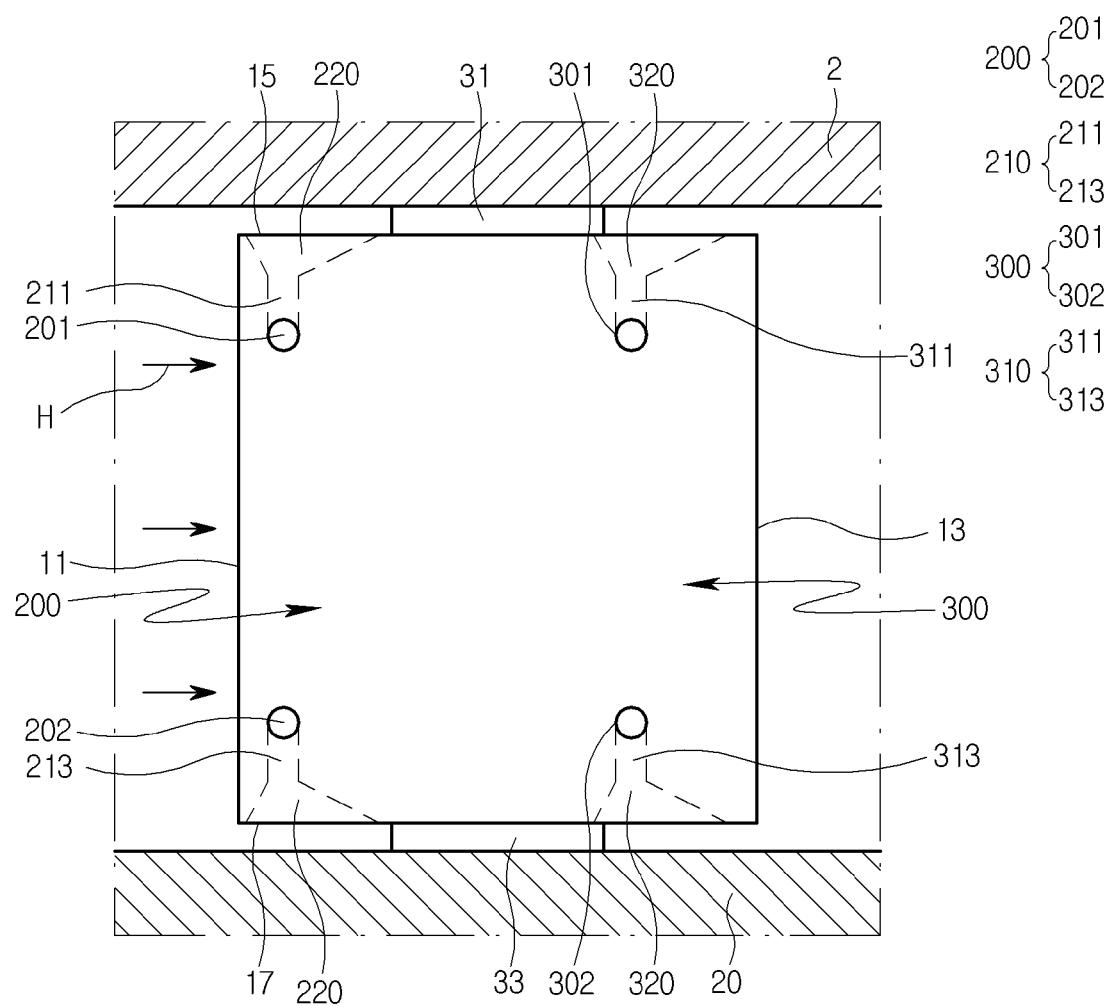

[FIG. 4C]
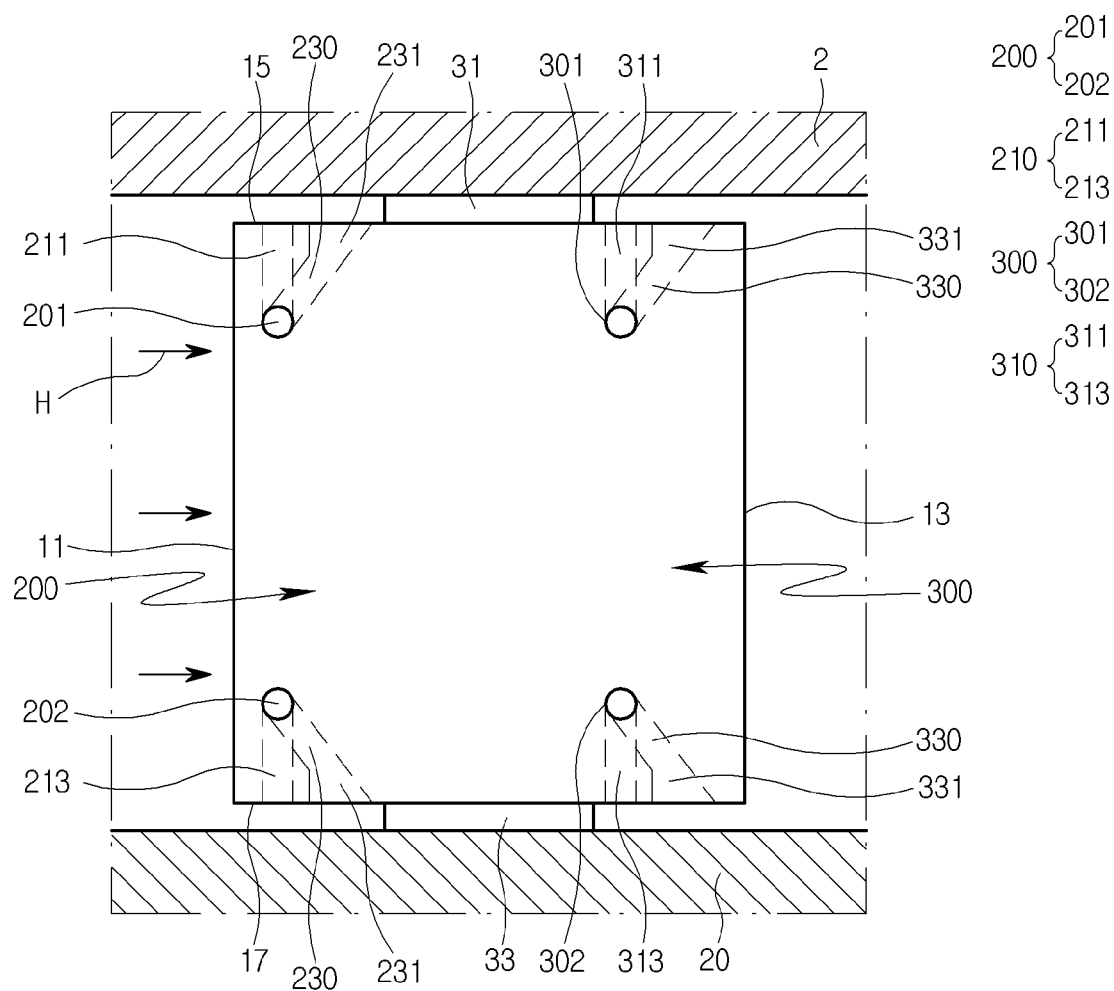

[FIG. 4D]
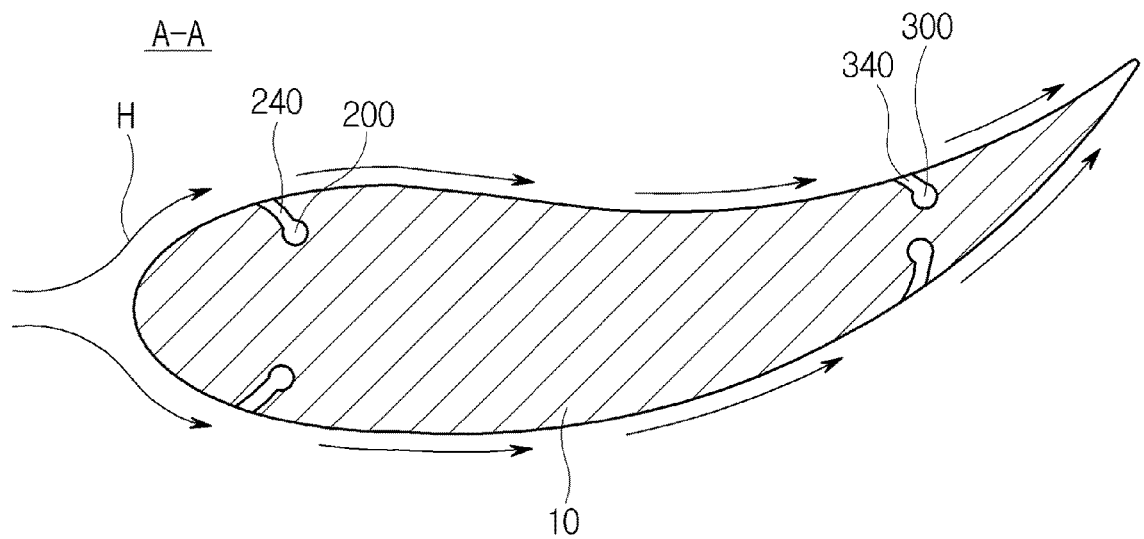
[FIG. 4E]
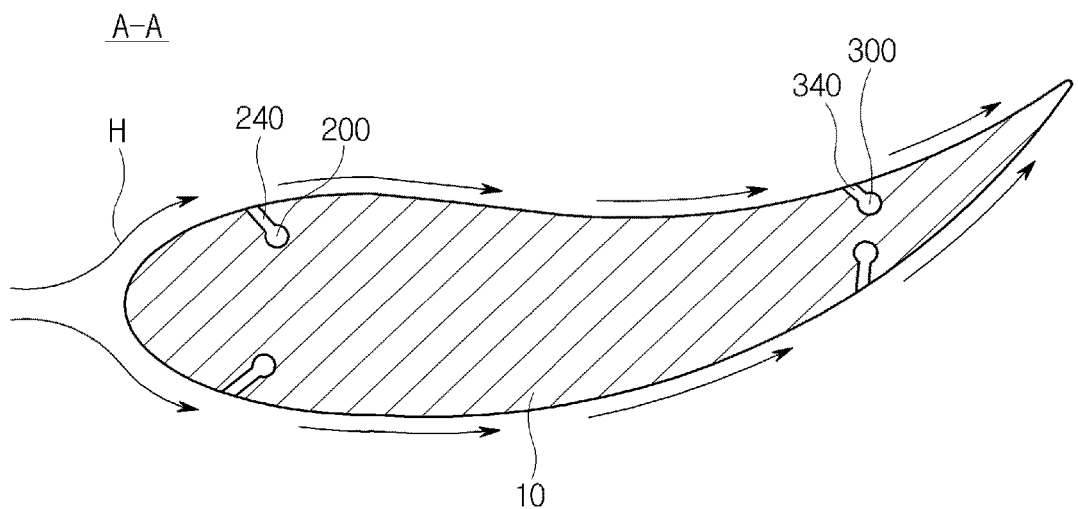

[FIG. 5A]
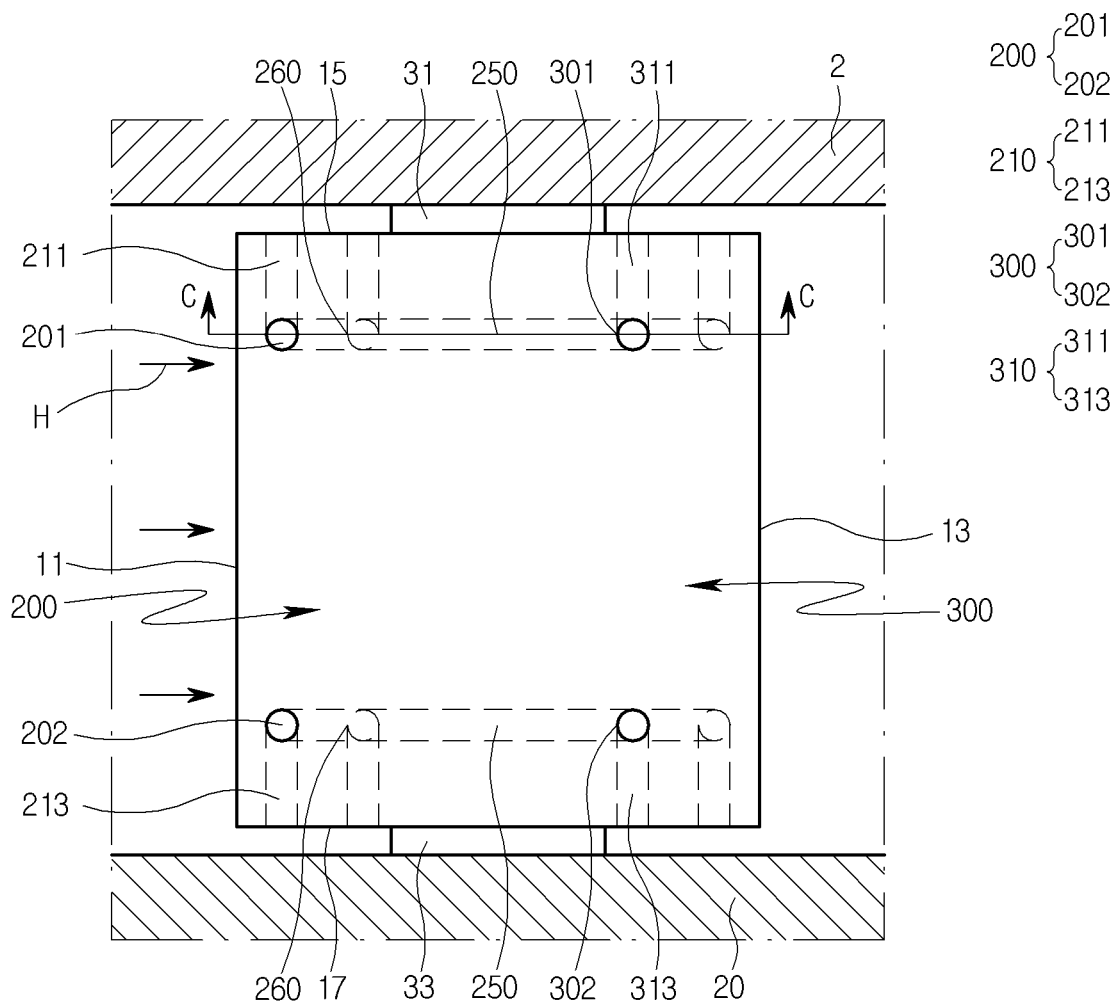
[FIG. 5B]
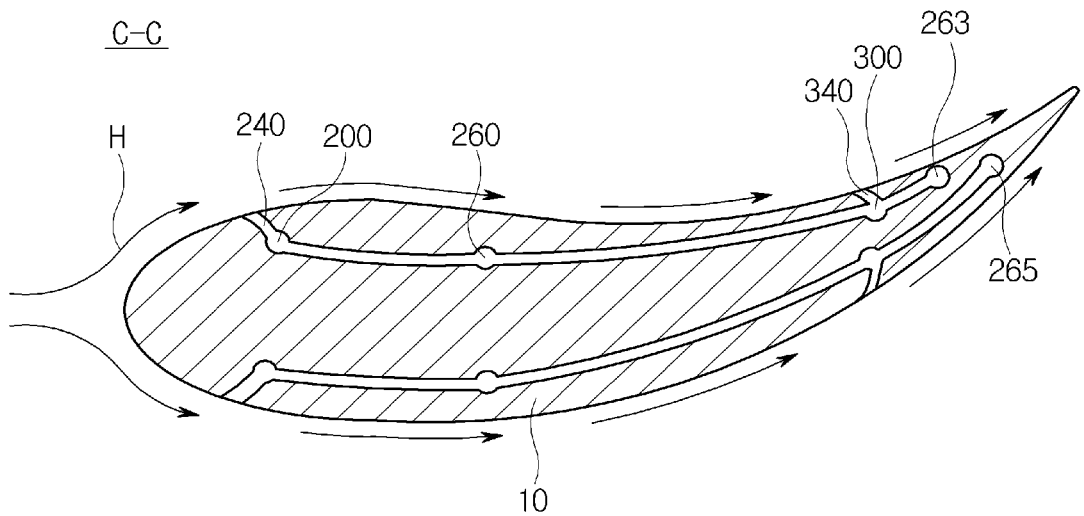

[FIG. 6A]
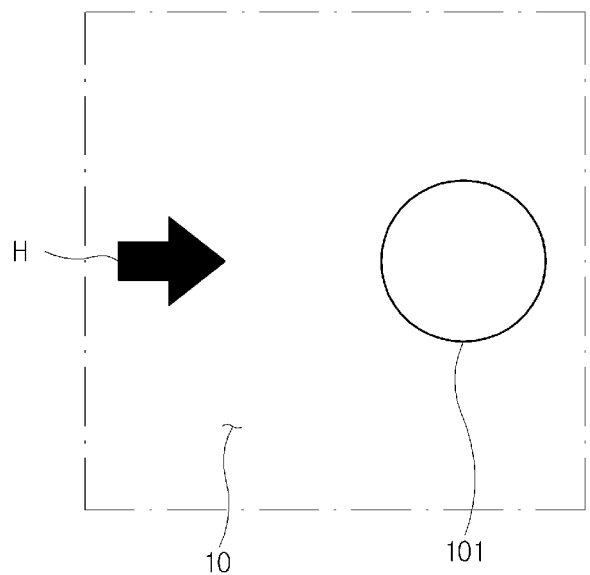
[FIG. 6B]
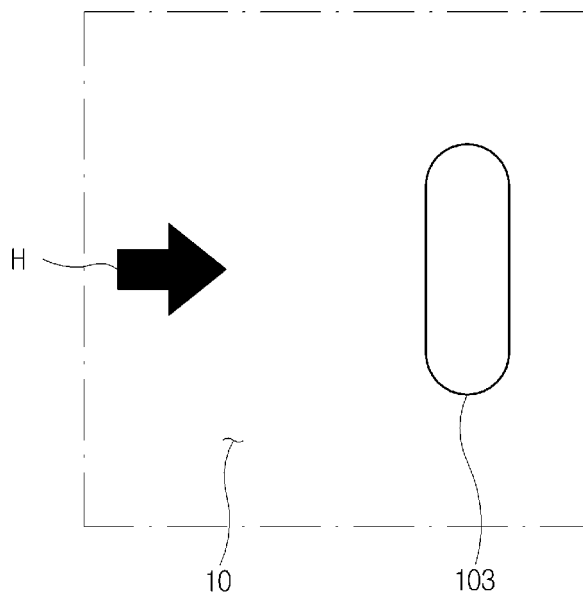

[FIG. 6C]
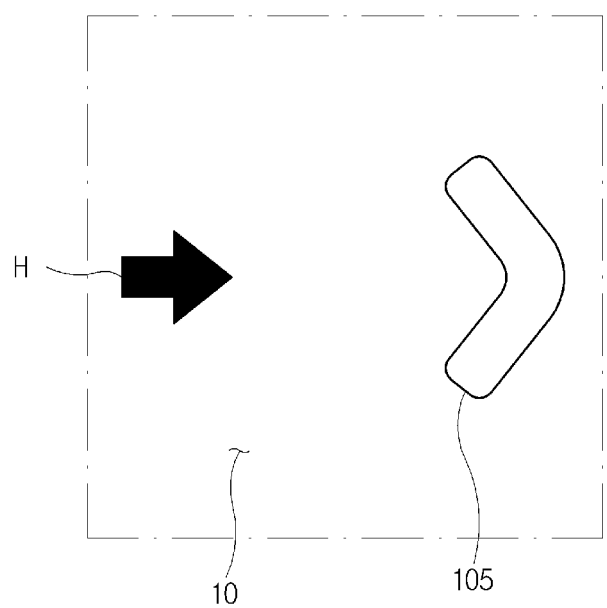

STATOR STRUCTURE AND GAS TURBINE HAVING THE SAME

CROSS-REFERENCE TO RELATED APPLICATION

This application claims priority to Korean Patent Application No. 10-2020-0022468, filed on Feb. 24, 2020, the disclosure of which is incorporated herein by reference in its entirety.

BACKGROUND

Technical Field

Apparatuses and methods consistent with exemplary embodiments relate to a stator structure and a gas turbine having the same, and more particularly, to a stator structure capable of reducing a loss of fluid near walls at both ends of a vane by bypassing a part of working fluid to a joint between the vane and a casing and a joint between the vane and a diaphragm, and a gas turbine having the same.

Description of the Related Art

In general, turbines are machines that convert the energy of a fluid, such as water, gas, or steam, into mechanical work, and are typically referred to as turbo machines in which a large number of vanes or blades are mounted to a circumference of each rotor and steam or gas is emitted thereto to rotate the rotor at high speed by impingement or reaction force.

Examples of the turbines include a water turbine using the energy of high-positioned water, a steam turbine using the energy of steam, an air turbine using the energy of high-pressure compressed air, a gas turbine using the energy of high-temperature and high-pressure gas, and the like.

The gas turbine includes a compressor, a combustor, a turbine, and a rotor.

The compressor includes a plurality of compressor vanes and a plurality of compressor blades, which are alternately arranged.

The combustor supplies fuel to air compressed by the compressor and ignites a mixture thereof with a burner to generate high-temperature and high-pressure combustion gas.

The turbine includes a plurality of turbine vanes and a plurality of turbine blades, which are alternately arranged.

The rotor is formed to pass through centers of the compressor, the combustor, and the turbine. The rotor is rotatably supported at both ends thereof by bearings, and one end thereof is connected to a drive shaft of a generator.

The rotor includes a plurality of compressor rotor disks each coupled to the compressor blades, a plurality of turbine rotor disks each coupled to the turbine blades, and a torque tube to transmit a rotational force from the turbine rotor disks to the compressor rotor disks.

In the gas turbine, the air compressed by the compressor is mixed with fuel in a combustion chamber so that the mixture thereof is burned to generate hot combustion gas, the generated combustion gas is supplied to the turbine, and the combustion gas generates a rotational force while passing through the turbine blades, thereby rotating the rotor.

The gas turbine has no mutual friction portion such as a piston-cylinder, thereby having the advantages that consumption of lubricant is extremely low and an operational stroke which is relatively long in common reciprocating mechanisms is reduced. Therefore, the gas turbine has an advantage of high-speed motion, thereby generating high-capacity power.

FIG. 1 is a view illustrating a related art a conventional stator structure. Referring to FIG. 1, a plurality of rows of stators 40 are arranged on an inner peripheral surface of a casing 2 and a plurality of rows of blades 3a are arranged on an outer peripheral surface of a rotor 3. Vanes 10 of the stators 40 and the blades 3a are arranged alternately.

Here, a first end 15 of each vane 10 is assembled to an outer ring (not shown) provided in the casing 2 by a rotating member 31, and a second end 17 of the vane 10 is assembled to a diaphragm 20 corresponding to an inner ring by a rotating member 33. For example, sealing members 21 and 2a may be disposed on the diaphragm 20 and the outer ring (not shown) of the casing 2, respectively.

A working fluid H flows into a leading edge 11 of the vane 10, passes through a trailing edge 13 of the vane 10, and flows toward an associated blade 3a.

When the vane 10 is assembled to the casing 2 and the diaphragm 20 by the rotating members 31 and 33, respectively, due to assembly tolerances for rotation, a first gap G1 is formed between the first end 15 of the vane 10 and the inner peripheral surface of the casing 2 and a second gap G2 is formed between the second end 17 of the vane 10 and the diaphragm 20, as shown in an enlarged view of FIG. 1.

In this case, the flow of the working fluid H into the first and second gaps G1 and G2 causes turbulence in an irregular direction, resulting in fluid loss near walls at the first and second ends 15 and 17 of the vane 10.

SUMMARY

Aspects of one or more exemplary embodiments provide a stator structure capable of reducing a fluid loss near walls at both ends of a vane by bypassing some working fluid to a joint between the vane and a casing and a joint between the vane and a diaphragm, and a gas turbine having the same.

Additional aspects will be set forth in part in the description which follows and, in part, will become apparent from the description, or may be learned by practice of the exemplary embodiments.

According to an aspect of an exemplary embodiment, there is provided a stator structure including a plurality of rows of stators arranged on an inner peripheral surface of a casing, the stators being arranged alternately with a plurality of rows of blades arranged on an outer peripheral surface of a rotor. Each of the stators may include a vane including a first end and a second end, the first end of the vane being coupled to the inner peripheral surface of the casing by a first rotating member, and a diaphragm coupled to the second end of the vane by a second rotating member. A first gap may be formed between the first end of the vane and the inner peripheral surface of the casing, and a second gap may be formed between the second end of the vane and the diaphragm. The vane may be provided with a slot part connected to the first and second ends of the vane to bypass a part of working fluid to the first and second gaps.

The slot part may include a first slot disposed adjacent to a leading edge of the vane, and a first tube connecting the first slot and the first and second ends of the vane.

The first slot may include a 1-1 slot disposed adjacent to the first gap on the leading edge of the vane, and a 1-2 slot disposed adjacent to the second gap on the leading edge of the vane. The first tube may include a 1-1 tube connecting the 1-1 slot and the first end of the vane, and a 1-2 tube connecting the 1-2 slot and the second end of the vane.

The slot part may further include a first expansion tube connected to the first tube and disposed at each of the first and second ends of the vane. The first expansion tube may be configured to diffuse a working fluid introduced from the first tube into the first and second gaps.

The slot part may further include a first inclined tube connected to the first slot, the first inclined tube being inclined with respect to a flow direction of a working fluid and connected to each of the first and second ends of the vane.

The slot part may further include a first inclined expansion tube connected to the first inclined tube and formed at each of the first and second ends of the vane. The first inclined expansion tube may be configured to diffuse a working fluid introduced from the first inclined tube into the first and second gaps.

The slot part may further include a first entry tube formed on the leading edge of the vane and connected to the first slot, and the first entry tube may be curved in a flow direction of a working fluid.

The slot part may further include a first entry tube formed on the leading edge of the vane and connected to the first slot, and the first entry tube may be inclined in a flow direction of a working fluid.

The slot part may further include a second slot disposed adjacent to a trailing edge of the vane, and a second tube connecting the second slot and the first and second ends of the vane.

The second slot may include a 2-1 slot disposed adjacent to the first gap on the trailing edge of the vane, and a 2-2 slot disposed adjacent to the second gap on the trailing edge of the vane. The second tube may include a 2-1 tube connecting the 2-1 slot and the first end of the vane, and a 2-2 tube connecting the 2-2 slot and the second end of the vane.

The slot part may further include a second expansion tube connected to the second tube and disposed at each of the first and second ends of the vane. The second expansion tube may be configured to diffuse a working fluid introduced from the second tube into the first and second gaps.

The slot part may further include a second inclined tube connected to the second slot, the second inclined tube being inclined with respect to a flow direction of a working fluid and connected to each of the first and second ends of the vane.

The slot part may further include a second inclined expansion tube connected to the second inclined tube and disposed at each of the first and second ends of the vane. The second inclined expansion tube may be configured to diffuse a working fluid introduced from the second inclined tube into the first and second gaps.

The slot part may further include a second entry tube formed on the trailing edge of the vane and connected to the second slot, and the second entry tube may be curved in a flow direction of a working fluid.

The slot part may further include a second entry tube formed on the trailing edge of the vane and connected to the second slot, and the second entry tube may be inclined in a flow direction of a working fluid.

The slot part may further include a connection tube disposed within the vane and connecting the first and second slots, and a cross tube disposed within the vane and connecting the connection tube and the first and second ends of the vane.

Each of the first and second slots may be a circular slot.

Each of the first and second slots may be an oval slot configured such that a major axis of the oval slot is placed perpendicular to a flow direction of a working fluid and a minor axis of the oval slot is placed in the flow direction of the working fluid.

Each of the first and second slots may be a bent slot bent in a flow direction of a working fluid.

According to an aspect of another exemplary embodiment, there is provided a gas turbine including a casing, a compression section disposed in the casing and configured to compress air, a combustor configured to combust a mixture of fuel with the compressed air, a turbine section configured to generate power using combustion gas discharged from the combustor, a rotor configured to connect the compressor section and the turbine section, and a diffuser configured to discharge the combustion gas passing through the turbine section to the outside. Each of the compressor section and the turbine section may be provided with a plurality of rows of blades arranged on an outer peripheral surface of the rotor and a plurality of rows of stators arranged on an inner peripheral surface of the casing, the blades and the stators being arranged alternately with each other. Each of the stators may include a vane including a first end and a second end, the first end of the vane being connected to the inner peripheral surface of the casing by a first rotating member, and a diaphragm connected to the second end of the vane by a second rotating member. A first gap may be formed between the first end of the vane and the inner peripheral surface of the casing, and a second gap may be formed between the second end of the vane and the diaphragm. The vane may be provided with a slot part connected to the first and second gaps so that a working fluid flows to the first and second gaps.

BRIEF DESCRIPTION OF THE DRAWINGS

The above and other aspects will become more apparent from the following description of the exemplary embodiments with reference to the accompanying drawings, in which:

FIG. 1 is a view illustrating a related art stator structure;

FIG. 2 is a view illustrating a general structure of a gas turbine;

FIG. 3 is a view illustrating a stator structure according to an exemplary embodiment;

FIG. 4A is a view illustrating a first example of a structure of a vane and a slot part according to the exemplary embodiment;

FIG. 4B is a view illustrating a second example of a structure of a vane and a slot part according to the exemplary embodiment;

FIG. 4C is a view illustrating a third example of a structure of a vane and a slot part according to the exemplary embodiment;

FIG. 4D is an exemplary cross-sectional view taken along line A-A of the structure illustrated in FIG. 4A;

FIG. 4E is another exemplary cross-sectional view taken along line A-A of the structure illustrated in FIG. 4A;

FIG. 5A is a view illustrating a fourth example of a structure of a vane and a slot part according to the exemplary embodiment;

FIG. 5B is a cross-sectional view taken along line C-C of the structure illustrated in FIG. 5A;

FIG. 6A is a view illustrating a form of first and second slots according to the exemplary embodiment;

FIG. 6B is a view illustrating another form of first and second slots according to the exemplary embodiment; and FIG. 6C is a view illustrating another form of first and second slots according to the exemplary embodiment.

DETAILED DESCRIPTION

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

Hereinafter, exemplary embodiments will be described with reference to the accompanying drawings. In order to clearly illustrate the disclosure in the drawings, some of the elements that are not essential to the complete understanding of the disclosure may be omitted, and like reference numerals refer to like elements throughout the specification.

FIG. 2 is a view illustrating a general structure of a gas turbine according to an exemplary embodiment.

Referring to FIG. 2, the gas turbine 1 may include a casing 2 defining an external appearance thereof, a compressor section 4 configured to compress air, a combustor 8 configured to burn a mixture of air and fuel, a turbine section 6 configured to generate power using combustion gas, a diffuser 7 configured to discharge exhaust gas, and a rotor 3 configured to connect the compressor section 4 and the turbine section 6 to transmit rotational power therebetween.

Based on a flow direction of gas (e.g., compressed air or combustion gas), the compressor section 4 is disposed at an upstream side of the gas turbine 1 and the turbine section 6 is disposed at a downstream side of the gas turbine 1. The combustor 8 is disposed between the compressor section 4 and the turbine section 6. Outside air is thermodynamically introduced into the compressor section 4 for an adiabatic compression process. The compressed air is introduced into the combustor 8 and mixed with fuel therein for an isobaric combustion process. The combustion gas is introduced into the turbine section 6 for an adiabatic expansion process.

The compressor section 4 includes vanes and rotors. The turbine section 6 includes vanes and rotors. The compressor vanes and rotors are arranged in a multi-stage arrangement along the flow direction of compressed air. The turbine vanes and rotors are arranged in a multi-stage arrangement along the flow direction of combustion gas. The compressor section 4 is designed such that an internal space is gradually decreased in size from a front stage to a rear stage so that air drawn into the compressor section 4 can be compressed. On the contrary, the turbine section 6 is designed such that an internal space is gradually increased in size from a front stage to a rear stage so that combustion gas received from the combustor 8 can expand.

Between the compressor section 4 and the turbine section 6, a torque tube 3b is provided to transmit the rotational torque generated by the turbine section 6 to the compressor section 4.

The compressor section 4 includes a plurality of compressor rotor disks 4a, and respective compressor rotor disks 4a is coupled to each other by a tie rod 3c to prevent axial separation in an axial direction.

The compressor rotor disks 4a are arranged in the axial direction with the tie rod 3c extending through central portions of the compressor rotor disks 4a. Adjacent compressor rotor disks are arranged such that opposing surfaces thereof are in tight contact with each other by being tightly fastened by the tie rod so that the adjacent compressor rotor disks cannot rotate relative to each other.

Each of the compressor rotor disks 4a has a plurality of blades 4b (or referred to as buckets) radially coupled to an outer peripheral surface thereof. Each of the blades 4b includes a dovetail-shaped root by which the blade 4b is fastened to the compressor rotor disk 4a.

Examples of fastening method of the dovetail-shaped root include a tangential type and an axial type, which may be selected according to the structure required for the gas turbine to be used. In some cases, the compressor blade 4b may be fastened to the compressor rotor disk 4a by using other fastening devices, such as a key or a bolt.

A plurality of vanes (or referred to as nozzles) are fixedly arranged on an inner peripheral surface of the compressor section 4, and rows of the vanes are arranged between rows of the blades 4b. While the compressor rotor disks 4a rotate along with a rotation of the tie rod 3c, the vanes fixed to the casing 2 do not rotate. The vanes guide the flow of compressed air moved from front-stage blades 4b of the compressor rotor disk 4a to rear-stage blades 4b of the compressor rotor disk 4a.

The tie rod 3c is disposed to pass through centers of the plurality of compressor rotor disks 4a. One end of the tie rod 3c is fastened to the compressor rotor disk 4a located at the foremost stage of the compressor section 4, and the other end of the tie rod 3c is fixed to the torque tube 3b.

It is understood that the tie rod 3c is not limited to the example illustrated in FIG. 2, and may be changed or vary according to one or more other exemplary embodiments. For example, there are three types of tie rods: a single-type in which one tie rod may penetrate the central portions of the compressor discs; a multi-type in which multiple tie rods may be arranged circumferentially; and a complex type in which the single-type and the multi-type may be combined.

In order to increase the pressure of fluid in the compressor section of the gas turbine and then adapt the angle of flow of the fluid, entering the inlet of the combustor, to a design angle of flow, a deswirler serving as a guide vane may be installed next to the diffuser 7.

The combustor 8 mixes the introduced compressed air with fuel and burns the mixture to produce high-temperature and high-pressure combustion gas with high energy. The temperature of the combustion gas is increased to a heat-resistant limit of the components of the combustor 8 and turbine section 6 through the isobaric combustion process.

The combustion system of the gas turbine may include a plurality of combustors 8 arranged in a form of a cell in the casing 2.

In the turbine section 6, the high-temperature and high-pressure combustion gas supplied from the combustor 8 applies impingement or reaction force to the blades of the turbine section 6 while expanding, resulting in mechanical energy.

A portion of the mechanical energy is supplied to the compressor section 4 via the torque tube 3b, and a remaining portion is used to produce electric power by driving a generator.

The turbine section 6 includes a plurality of vanes and blades alternately arranged therein, and the blades are driven by combustion gas to rotate the output shaft connected to the generator.

The turbine section 6 basically is similar to the compressor section 4 in structure. That is, the turbine section 6 includes a plurality of turbine rotor disks 6a similar to the compressor rotor disk 4a, and respective turbine rotor disks 6a are coupled to each other.

A plurality of turbine blades 6b (or referred to as buckets) are arranged radially. Each of the turbine blades 6b may also have a dovetail-shaped root so that the turbine blade 6b is coupled to the turbine rotor disk 6a through the root.

A plurality of vanes (or referred to as nozzles) are fixedly arranged on an inner peripheral surface of the turbine section 6.

In the gas turbine having the above-described structure, the introduced air is compressed in the compressor section 4, the mixture of the compressed air with fuel is burned in the combustor 8, and the combustion gas flows to the turbine section 6 to drive the generator and is discharged to the atmosphere through the diffuser 7.

Here, the rotating component such as the torque tube 3b, the compressor rotor disk 4a, the compressor blade 4b, the turbine rotor disk 6a, the turbine blade 6b, and the tie rod 3c may be collectively referred to as a rotor or a rotating unit. The non-rotating component such as the casing 2, the vane, and the diaphragm may be collectively referred to as a stator or a fixed unit.

FIG. 3 is a view illustrating a structure of a stator 40 according to an exemplary embodiment.

Referring to FIG. 3, a plurality of rows of blades 3a are arranged on the outer peripheral surface of a rotor 3. For example, the rotor 3 is disposed at the center in a casing 2 and has a plurality of rows of rotor disks longitudinally arranged on the outer peripheral surface thereof. Each of the rotor disks has a plurality of female dovetail-shaped coupling slots, which are formed on the outer peripheral surface thereof and to which the blades 3a may be coupled. Each of the blades 3a has a male dovetail-shaped root coupled to the associated coupling slot of the rotor disk. Thus, the blades 3a are arranged on the outer peripheral surface of the rotor 3.

A plurality of rows of stators 40 are arranged on the inner peripheral surface of the casing 2. In this case, the stators 40 and the blades 3a are arranged alternately.

Each of the stators 40 may include a vane 10 and a diaphragm 20. A first end 15 of the vane 10 may be coupled to the inner peripheral surface of the casing 2 by a first rotating member 31. An outer ring may be mounted on the inner peripheral surface of the casing 2, and the first end 15 of the vane 10 may be coupled to the inner peripheral surface of the outer ring by the first rotating member 31. In the exemplary embodiment, the casing 2 may be represented as having the outer ring.

The first rotating member 31 may include an actuator and a shaft. The actuator may be disposed within the casing 2 and may be connected to the first end 15 of the vane 10 by the shaft. Therefore, when an operator wants to change the angle of the vane 10, the operator may adjust the angle of the vane 10 by operating the actuator.

A second end 17 of the vane 10 may be coupled to the diaphragm 20 by a second rotating member 33. The second rotating member 33 may be a shaft that rotates the vane 10. The diaphragm 20 may correspond to an inner ring of the stator 40. That is, the vane 10 may be coupled to the casing 2 or between the outer ring of the casing 2 and the diaphragm 20 by the first and second rotating members 31 and 33.

A first gap G1 may be formed between the first end 15 of the vane 10 and the inner peripheral surface of the casing 2 due to rotational tolerance, and a second gap G2 may be formed between the second end 17 of the vane 10 and the diaphragm 20 due to rotational tolerance.

The vane 10 must be spaced apart by a predetermined distance from the inner peripheral surface of the casing 2 and the outer peripheral surface of the diaphragm 20 for rotation. If there is no gap therebetween, the vane 10 may be worn/damaged by contact friction between the casing 2 and the diaphragm 20 whenever the angle of the vane 10 is adjusted.

Therefore, in order to smoothly adjust the angle of the vane 10, a predetermined gap is required between the vane 10 and the casing 2 and between the vane 10 and the diaphragm 20.

When the gas turbine is operated, a working fluid flows into a leading edge 11 of the vane 10 and passes through a trailing edge 13 of the vane 10 to the blade 3a. In this case, part of the working fluid is introduced into the first and second gaps G1 and G2.

The working fluid introduced into the first and second gaps G1 and G2 generates turbulence in the vicinity of walls as both ends of the vane 10, which affects the flow of the working fluid near the walls of the vane 10, resulting in loss of fluid. This causes a deterioration in overall efficiency of the gas turbine.

Therefore, in the exemplary embodiment, the vane 10 is provided with a slot part 100 connected to the first and second gaps G1 and G2 so that a part of the working fluid is bypassed to the first and second gaps G1 and G2. This reduces the loss of fluid near the walls of the vane 10 by suppressing the generation of turbulence by the working fluid near the walls.

FIG. 4A is a view illustrating a first example of a structure of a vane 10 and a slot part 100 according to the exemplary embodiment. FIG. 4B is a view illustrating a second example of a structure of a vane 10 and a slot part 100 according to the exemplary embodiment. FIG. 4C is a view illustrating a third example of a structure of a vane 10 and a slot part 100 according to the exemplary embodiment.

Referring to FIG. 4A, the slot part 100 may include a first slot 200, a first tube 210, a second slot 300, and a second tube 310.

The first slot 200 may be disposed adjacent to the leading edge 11 of the vane 10. The first tube 210 may connect the first slot 200 and the first and second ends 15 and 17 of the vane 10. The first tube 210 may be inserted and disposed in the vane 10 or formed by hole processing.

For example, the first slot 200 may include a 1-1 slot 201 disposed adjacent to the first gap G1 on the leading edge 11 of the vane 10, and a 1-2 slot 202 disposed adjacent to the second gap G2 on the leading edge 11 of the vane 10.

The first tube 210 may include a 1-1 tube 211 connecting the 1-1 slot 201 and the first end 15 of the vane 10 and a 1-2 tube 213 connecting the 1-2 slot 202 and the second end 17 of the vane 10.

The second slot 300 may be disposed adjacent to the trailing edge 13 of the vane 10. The second tube 310 may connect the second slot 300 and the first and second ends 15 and 17 of the vane 10. The second tube 310 may be inserted and disposed in the vane 10 or formed by hole processing.

For example, the second slot 300 may include a 2-1 slot 301 disposed adjacent to the first gap G1 on the trailing edge 13 of the vane 10, and a 2-2 slot 302 disposed adjacent to the second gap G2 on the trailing edge 13 of the vane 10.

The second tube 310 may include a 2-1 tube 311 connecting the 2-1 slot 301 and the first end 15 of the vane 10 and a 2-2 tube 313 connecting the 2-2 slot 302 and the second end 17 of the vane 10.

A working fluid H flows into the leading edge 11 of the vane 10, in which case part of the working fluid is sprayed into the first and second gaps G1 and G2 through the first slot 200 and the first tube 210 formed near the leading edge 11 of the vane 10.

Then, the working fluid H flowing along the surface of the vane 10 flows out to the trailing edge 13 of the vane 10, in which case part of the working fluid is sprayed into the first and second gaps G1 and G2 through the second slot 300 and the second tube 310 formed near the trailing edge 13 of the vane 10.

As such, with respect to a part of the working fluid sprayed into the first and second gaps G1 and G2 through the first and second slots 200 and 300 and the first and second tubes 210 and 310, as in the enlarged view of FIG. 3, a working fluid P flows from the casing 2 to the first end 15 of the vane 10 in the first gap G1 and a working fluid P flows from the diaphragm 20 to the second end 17 of the vane 10 in the second gap G2.

That is, in the first gap G1, the working fluid P flows from the casing 2 to the first end 15 of the vane 10 in the form of a sub-stream. Therefore, the flow branched from the main stream of the working fluid H towards the first end 15 of the vane 10 is offset. Accordingly, part of the working fluid H corresponding to the main stream may not be branched and introduced into the first gap G1, thereby reducing the loss of fluid near the walls due to turbulence generated by the working fluid H.

Likewise, in the second gap G2, the working fluid P flows from the diaphragm 20 to the second end 17 of the vane 10 in the form of a sub-stream. Therefore, the flow branched from the main stream of the working fluid H towards the second end 17 of the vane 10 is offset. Accordingly, part of the working fluid H corresponding to the main stream may not be branched and introduced into the second gap G2, thereby reducing the loss of fluid near the walls due to turbulence generated by the working fluid H.

Ultimately, the efficiency of the gas turbine is improved.

Referring to FIG. 4B, the slot part 100 may include a first slot 200, a first tube 210, a first expansion tube 220, a second slot 300, a second tube 310, and a second expansion tube 320.

Because the first slot 200, the first tube 210, the second slot 300, and the second tube 310 are the same as those of the first example of FIG. 4A, a description thereof will be omitted.

The first expansion tube 220 may be connected to the first tube 210 and disposed at each of the first and second ends 15 and 17 of the vane 10. The first expansion tube 220 functions to diffuse the working fluid introduced from the first tube 210 into the first and second gaps G1 and G2.

The second expansion tube 320 may be connected to the second tube 310 and disposed at each of the first and second ends 15 and 17 of the vane 10. Similar to the first expansion tube 220, the second expansion tube 320 functions to diffuse the working fluid introduced from the second tube 310 into the first and second gaps G1 and G2.

Here, the first expansion tube 220 may be disposed to diffuse the working fluid into the first gap G1 near the wall of the leading edge 11 of the vane 10, and the second expansion tube 320 may be disposed to diffuse the working fluid into the second gap G2 near the wall of the trailing edge 13 of the vane 10.

If the first expansion tube 220 or second expansion tube 320 is disposed alone, it may be formed in a range from the leading edge 11 to the trailing edge 13 of the vane 10 at each of the first and second ends 15 and 17 of the vane 10.

With respect to a part of the working fluid sprayed into the first and second gaps G1 and G2 through the first and second expansion tubes 220 and 230, as in the enlarged view of FIG. 3, a working fluid P flows from the casing 2 to the first end 15 of the vane 10 in the first gap G1 and a working fluid P flows from the diaphragm 20 to the second end 17 of the vane 10 in the second gap G2.

That is, in the first gap G1, the working fluid P flows from the casing 2 to the first end 15 of the vane 10 in the form of a sub-stream. Therefore, the flow branched from the main stream of the working fluid H towards the first end 15 of the vane 10 is offset. Accordingly, part of the working fluid H corresponding to the main stream may not be branched and introduced into the first gap G1, thereby reducing the loss of fluid near the walls due to turbulence generated by the working fluid H.

Likewise, in the second gap G2, the working fluid P flows from the diaphragm 20 to the second end 17 of the vane 10 in the form of a sub-stream. Therefore, the flow branched from the main stream of the working fluid H towards the second end 17 of the vane 10 is offset. Accordingly, part of the working fluid H corresponding to the main stream may not be branched and introduced into the second gap G2, thereby reducing the loss of fluid near the walls due to turbulence generated by the working fluid H.

Ultimately, the efficiency of the gas turbine is improved.

Referring to FIG. 4C, the slot part 100 may include a first slot 200, a first tube 210, a first inclined tube 230, a first inclined expansion tube 231, a second slot 300, a second tube 310, a second inclined tube 330, and a second inclined expansion tube 331.

Because the first slot 200, the first tube 210, the second slot 300, and the second tube 310 are the same as those of the first example of FIG. 4A, a description thereof will be omitted.

The first inclined tube 230 may be connected to the first slot 200, may be inclined with respect to the flow of the working fluid, and may be connected to each of the first and second ends 15 and 17 of the vane 10.

The first inclined expansion tube 231 may be connected to the first inclined tube 230 and may be formed at each of the first and second ends 15 and 17 of the vane 10. The first inclined expansion tube 231 may function to diffuse the working fluid introduced from the first inclined tube 230 into the first and second gaps G1 and G2.

The second inclined tube 330 may be connected to the second slot 300, may be inclined with respect to the flow of the working fluid, and may be connected to each of the first and second ends 15 and 17 of the vane 10.

The second inclined expansion tube 331 may be connected to the second inclined tube 330 and may be formed at each of the first and second ends 15 and 17 of the vane 10. Similar to the first inclined expansion tube 231, the second inclined expansion tube 331 may function to diffuse the working fluid introduced from the second inclined tube 330 into the first and second gaps G1 and G2.

Here, the first and second inclined tubes 230 and 330 are inclined with respect to the direction of flow of the working fluid H. Thus, the working fluid can be introduced relatively smoothly into the first and second inclined tubes 230 and 330. That is, resistance to the inflow of the working fluid H can be reduced.

Here, the first inclined expansion tube 231 may be disposed to diffuse the working fluid into the first gap G1 near the wall of the leading edge 11 of the vane 10, and the second inclined expansion tube 331 may be disposed to diffuse the working fluid into the second gap G2 near the wall of the trailing edge 13 of the vane 10.

If the first inclined expansion tube 231 or second inclined expansion tube 331 is disposed alone, it may be formed in a range from the leading edge 11 to the trailing edge 13 of the vane 10 at each of the first and second ends 15 and 17 of the vane 10.

With respect to a part of the working fluid sprayed into the first and second gaps G1 and G2 through the first and second inclined expansion tubes 231 and 331, as in the enlarged view of FIG. 3, a working fluid P flows from the casing 2 to the first end 15 of the vane 10 in the first gap G1 and a working fluid P flows from the diaphragm 20 to the second end 17 of the vane 10 in the second gap G2.

That is, in the first gap G1, the working fluid P flows from the casing 2 to the first end 15 of the vane 10 in the form of a sub-stream. Therefore, the flow branched from the main stream of the working fluid H towards the first end 15 of the vane 10 is offset. Accordingly, part of the working fluid H corresponding to the main stream may not be branched and introduced into the first gap G1, thereby reducing the loss of fluid near the walls due to turbulence generated by the working fluid H.

Likewise, in the second gap G2, the working fluid P flows from the diaphragm 20 to the second end 17 of the vane 10 in the form of a sub-stream. Therefore, the flow branched from the main stream of the working fluid H towards the second end 17 of the vane 10 is offset. Accordingly, part of the working fluid H corresponding to the main stream may not be branched and introduced into the second gap G2, thereby reducing the loss of fluid near the walls due to turbulence generated by the working fluid H.

Ultimately, the efficiency of the gas turbine is improved.

FIG. 4D is a cross-sectional view taken along line A-A of FIG. 4A. Referring to FIG. 4D, the slot part 100 may further include a first entry tube 240 and a second entry tube 340. The first and second entry tubes 240 and 340 may be applied to all of the first, second, and third examples of the exemplary embodiment.

The first entry tube 240 may be formed on the leading edge 11 of the vane 10 and may be connected to the first slot 200. In this case, the first entry tube 240 may be curved in the flow direction of the working fluid H.

The second entry tube 340 may be formed on the trailing edge 13 of the vane 10 and may be connected to the second slot 300. Likewise, the second entry tube 340 may be curved in the flow direction of the working fluid H.

Here, the main stream of the working fluid H flows into the leading edge 11 of the vane 10, flows along the surface of the vane 10, and flows out to the trailing edge 13 of the vane 10.

In this case, because the curved first and second entry tubes 240 and 340 are formed on the surface of the vane 10, part of the working fluid H flowing along the surface of the vane 10 may be introduced relatively smoothly into the first and second slots 200 and 300.

FIG. 4E is another cross-sectional view taken along line A-A of FIG. 4A. Referring to FIG. 4E, the slot part 100 may further include a first entry tube 240 and a second entry tube 340. The first and second entry tubes 240 and 340 may be applied to all of the first, second, and third examples of the exemplary embodiment.

The first entry tube 240 may be formed on the leading edge 11 of the vane 10 and may be connected to the first slot 200. In this case, the first entry tube 240 may be inclined in the flow direction of the working fluid H.

The second entry tube 340 may be formed on the trailing edge 13 of the vane 10 and may be connected to the second slot 300. Likewise, the second entry tube 340 may be inclined in the flow direction of the working fluid H.

Here, the main stream of the working fluid H flows into the leading edge 11 of the vane 10, flows along the surface of the vane 10, and flows out to the trailing edge 13 of the vane 10.

In this case, because the inclined first and second entry tubes 240 and 340 are formed on the surface of the vane 10, part of the working fluid H flowing along the surface of the vane 10 may be introduced relatively smoothly into the first and second slots 200 and 300.

FIG. 5A is a view illustrating a fourth example of a structure of a vane 10 and a slot part 100 according to the exemplary embodiment. FIG. 5B is a cross-sectional view taken along line C-C of the structure illustrated in FIG. 5A.

Referring to FIG. 5A, the slot part 100 may include a first slot 200, a first tube 210, a second slot 300, a second tube 310, a connection tube 250, and a cross tube 260. Because the first slot 200, the first tube 210, the second slot 300, and the second tube 310 are the same as those of the first example of FIG. 4A, a description thereof will be omitted.

The connection tube 250 may be disposed within the vane 10 and may connect the first and second slots 200 and 300. The cross tube 260 may be disposed within the vane 10 and may connect the connection tube 250 and the first and second ends 15 and 17 of the vane 10.

The working fluid H introduced from the first and second slots 200 and 300 is shared with each other through the connection tube 250, in which case the flow in the connection tube 250 may be somewhat uniform between the leading edge 11 and the trailing edge 13 of the vane 10.

The working fluid introduced into the connection tube 250 is sprayed into the first and second gaps G1 and G2 through the cross tube 260.

In this case, the first and second tubes 210 and 310 and the cross tube 260 may consist of a plurality of tubes spaced apart at predetermined intervals along the first and second ends 15 and 17 of the vane 10. Therefore, the working fluid sprayed into the first and second gaps G1 and G2 exhibits a flow similar to that in the enlarged view of FIG. 3 in a wide range.

Referring back to the enlarged view of FIG. 3, the first and second tubes 210 and 310 and the cross tube 260 allow a working fluid P to flow from the casing 2 to the first end 15 of the vane 10 in the first gap G1 and allow a working fluid P to flow from the diaphragm 20 to the second end 17 of the vane 10 in the second gap G2.

That is, in the first gap G1, the working fluid P flows from the casing 2 to the first end 15 of the vane 10 in the form of a sub-stream. Therefore, the flow branched from the main stream of the working fluid H towards the first end 15 of the vane 10 is offset. Accordingly, part of the working fluid H corresponding to the main stream may not be branched and introduced into the first gap G1, thereby reducing the loss of fluid near the walls due to turbulence generated by the working fluid H.

Likewise, in the second gap G2, the working fluid P flows from the diaphragm 20 to the second end 17 of the vane 10 in the form of a sub-stream. Therefore, the flow branched from the main stream of the working fluid H towards the second end 17 of the vane 10 is offset. Accordingly, part of the working fluid H corresponding to the main stream may not be branched and introduced into the second gap G2, thereby reducing the loss of fluid near the walls due to turbulence generated by the working fluid H.

Ultimately, the efficiency of the gas turbine is improved.

Referring to FIG. 5B, the first and second entry tubes may also be used in the fourth example of the embodiment. The first entry tube 240 may be formed on the leading edge 11 of the vane 10 and may be connected to the first slot 200. In this case, the first entry tube 240 may be inclined in the flow direction of the working fluid H.

The second entry tube 340 may be formed on the trailing edge 13 of the vane 10 and may be connected to the second slot 300. Likewise, the second entry tube 340 may be inclined in the flow direction of the working fluid H.

Here, the main stream of the working fluid H flows into the leading edge 11 of the vane 10, flows along the surface of the vane 10, and flows out to the trailing edge 13 of the vane 10.

In this case, because the inclined first and second entry tubes 240 and 340 are formed on the surface of the vane 10, part of the working fluid H flowing along the surface of the vane 10 may be introduced relatively smoothly into the first and second slots 200 and 300.

Part of the working fluid introduced into the first and second slots 200 and 300 is shared with each other through the connection tube 250. The working fluid may be sprayed into the first and second gaps G1 and G2 through the cross tube 260 as well as the first and second tubes 210 and 310.

In this case, the length of the end of the connection tube 250 may vary in the vicinity of the trailing edge 13 of the vane 10. That is, one cross tube 263 and another cross tube 265 may be positioned to be misaligned, to further suppress the generation of turbulence in the first and second gaps G1 and G2 near the trailing edge 13 of the vane 10.

FIG. 6A is a view illustrating a form of first and second slots 200 and 300 according to an exemplary embodiment. FIG. 6B is a view illustrating another form of first and second slots 200 and 300 according to an exemplary embodiment. FIG. 6C is a view illustrating another form of first and second slots 200 and 300 according to an exemplary embodiment.

Referring to FIG. 6A, each of the first and second slots 200 and 300 may be implemented as a general circular slot 101.

Referring to FIG. 6B, for better introduction of the working fluid H into the first and second slots 200 and 300, each of the first and second slots 200 and 300 may be implemented as an oval slot 103. In this case, the major axis (i.e., long axis) of the oval slot 103 may be placed perpendicular to the flow direction of the working fluid H and the minor axis (i.e., short axis) of the oval slot 103 may be placed in the flow direction of the working fluid H.

Referring to FIG. 6C, for better introduction of the working fluid H into the first and second slots 200 and 300, each of the first and second slots 200 and 300 may be implemented as a bent slot 105 that is bent in the flow direction of the working fluid H.

As described above, according to one or more exemplary embodiments, it is possible to reduce a loss of fluid near the walls at both ends of the vane by bypassing part of working fluid to the joint between the vane and the casing and the joint between the vane and the diaphragm.

Due to the assembly tolerances for the rotation of the vane, gaps are formed in the joint between the vane and the casing and the joint between the vane and the diaphragm, respectively. Therefore, part of the working fluid flowing in the axial direction flows into the gaps, causing turbulence in a narrow space, resulting in the loss of fluid.

The one or more exemplary embodiments are to reduce the loss of fluid in the gaps by spraying part of working fluid into the gaps and offsetting the introduction of the working fluid flowing in the axial direction into the gaps, thereby increasing the performance efficiency of the gas turbine.

While exemplary embodiments have been described with reference to the accompanying drawings, it will be apparent to those skilled in the art that various changes and modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A stator structure comprising:
   a plurality of rows of stators arranged on an inner peripheral surface of a casing, the stators being arranged alternately with a plurality of rows of blades arranged on an outer peripheral surface of a rotor,
   wherein each of the stators comprises:
   a vane including a first end and a second end, the first end of the vane being coupled to the inner peripheral surface of the casing by a first rotating member; and
   a diaphragm coupled to the second end of the vane by a second rotating member,
   wherein a first gap is formed between the first end of the vane and the inner peripheral surface of the casing, and a second gap is formed between the second end of the vane and the diaphragm, and
   wherein the vane is provided with a slot part connected to the first and second ends of the vane to bypass a part of working fluid to the first and second gaps,
   wherein the slot part comprises;
   first slots disposed adjacent to a leading edge of the vane;
   first tubes connecting the first slots and the first and second ends of the vane;
   second slots disposed adjacent to a trailing edge of the vane; and
   second tubes connecting the second slots and the first and second ends of the vane.

2. The stator structure according to claim 1, wherein the first slots comprise:
   a 1-1 slot disposed adjacent to the first gap on the leading edge of the vane; and
   a 1-2 slot disposed adjacent to the second gap on the leading edge of the vane, and wherein the first tube comprises:
   a 1-1 tube connecting the 1-1 slot and the first end of the vane; and
   a 1-2 tube connecting the 1-2 slot and the second end of the vane.

3. The stator structure according to claim 2, wherein the slot part further comprises a first expansion tube connected to the first tube and disposed at each of the first and second ends of the vane, and the first expansion tube is configured to diffuse a working fluid introduced from the first tube into the first and second gaps.

4. The stator structure according to claim 2, wherein the slot part further comprises a first inclined tube connected to the first slots, the first inclined tube being inclined with respect to a flow direction of a working fluid and connected to each of the first and second ends of the vane.

5. The stator structure according to claim 4, wherein the slot part further comprises a first inclined expansion tube connected to the first inclined tube and formed at each of the first and second ends of the vane, and the first inclined expansion tube is configured to diffuse a working fluid introduced from the first inclined tube into the first and second gaps.

6. The stator structure according to claim 2, wherein the slot part further comprises a first entry tube formed on the leading edge of the vane and connected to the first slots, and the first entry tube is curved in a flow direction of a working fluid.

7. The stator structure according to claim 2, wherein the slot part further comprises a first entry tube formed on the leading edge of the vane and connected to the first slots, and the first entry tube is inclined in a flow direction of a working fluid.

8. The stator structure according to claim 1, wherein the second slot comprises:
 a 2-1 slot disposed adjacent to the first gap on the trailing edge of the vane; and
 a 2-2 slot disposed adjacent to the second gap on the trailing edge of the vane, and wherein the second tube comprises:
 a 2-1 tube connecting the 2-1 slot and the first end of the vane; and
 a 2-2 tube connecting the 2-2 slot and the second end of the vane.

9. The stator structure according to claim 1, wherein the slot part further comprises a second expansion tube connected to the second tube and disposed at each of the first and second ends of the vane, and the second expansion tube is configured to diffuse a working fluid introduced from the second tube into the first and second gaps.

10. The stator structure according to claim 9, wherein the slot part further comprises a second inclined tube connected to the second slots, the second inclined tube being inclined with respect to a flow direction of a working fluid and connected to each of the first and second ends of the vane.

11. The stator structure according to claim 10, wherein the slot part further comprises a second inclined expansion tube connected to the second inclined tube and disposed at each of the first and second ends of the vane, and the second inclined expansion tube is configured to diffuse a working fluid introduced from the second inclined tube into the first and second gaps.

12. The stator structure according to claim 1, wherein the slot part further comprises a second entry tube formed on the trailing edge of the vane and connected to the second slots, and the second entry tube is curved in a flow direction of a working fluid.

13. The stator structure according to claim 1, wherein the slot part further comprises a second entry tube formed on the trailing edge of the vane and connected to the second slots, and the second entry tube is inclined in a flow direction of a working fluid.

14. The stator structure according to claim 1, wherein the slot part further comprises:
 a connection tube disposed within the vane and connecting the first and second slots; and
 a cross tube disposed within the vane and connecting the connection tube and the first and second ends of the vane.

15. The stator structure according to claim 9, wherein each of the first and second slots is a circular slot.

16. The stator structure according to claim 9, wherein each of the first and second slots is an oval slot configured such that a major axis of the oval slot is placed perpendicular to a flow direction of a working fluid and a minor axis of the oval slot is placed in the flow direction of the working fluid.

17. The stator structure according to claim 1, wherein each of the first and second slots is a bent slot bent in a flow direction of a working fluid.

18. A gas turbine comprising:
 a casing;
 a compression section disposed in the casing and configured to compress air; a combustor configured to combust a mixture of fuel with the compressed air; a turbine section configured to generate power using combustion gas discharged from the combustor;
 a rotor configured to connect the compressor section and the turbine section; and
 a diffuser configured to discharge the combustion gas passing through the turbine section to the outside,
 wherein each of the compressor section and the turbine section are provided with a plurality of rows of blades arranged on an outer peripheral surface of the rotor and a plurality of rows of stators arranged on an inner peripheral surface of the casing, the blades and the stators being arranged alternately with each other,
 wherein each of the stators comprises:
 a vane including a first end and a second end, the first end of the vane being connected to the inner peripheral surface of the casing by a first rotating member; and
 a diaphragm connected to the second end of the vane by a second rotating member,
 wherein a first gap is formed between the first end of the vane and the inner peripheral surface of the casing, and a second gap is formed between the second end of the vane and the diaphragm, and
 wherein the vane is provided with a slot part connected to the first and second gaps so that a working fluid flows to the first and second gaps,
 wherein the slot part comprises;
 first slots disposed adjacent to a leading edge of the vane;
 first tubes connecting the first slots and the first and second ends of the vane;
 second slots disposed adjacent to a trailing edge of the vane; and
 second tubes connecting the second slots and the first and second ends of the vane.

* * * * *